United States Patent
Satpathy et al.

(10) Patent No.: US 8,543,535 B2
(45) Date of Patent: Sep. 24, 2013

(54) GENERATION OF STAR SCHEMAS FROM SNOWFLAKE SCHEMAS CONTAINING A LARGE NUMBER OF DIMENSIONS

(75) Inventors: Samir Satpathy, Bangalore (IN); Alextair Dominico Mascarenhas, Redwood Shores, CA (US); Harvard Jun-Hua Pan, Allston, MA (US); Kenneth Khiaw Hong Eng, Redwood Shores, CA (US); Ladislav Kovac, Ottawa (CA)

(73) Assignee: Oracle International Corporation, Redwood Shores, CA (US)

( * ) Notice: Subject to any disclaimer, the term of this patent is extended or adjusted under 35 U.S.C. 154(b) by 352 days.

(21) Appl. No.: 12/711,269

(22) Filed: Feb. 24, 2010

(65) Prior Publication Data
US 2011/0208692 A1    Aug. 25, 2011

(51) Int. Cl.
*G06F 7/00* (2006.01)
*G06F 17/00* (2006.01)

(52) U.S. Cl.
USPC .......................................... 707/601; 707/604

(58) Field of Classification Search
USPC ................................................ 707/601, 604
See application file for complete search history.

(56) References Cited

U.S. PATENT DOCUMENTS

| | | | |
|---|---|---|---|
| 6,356,900 B1 | 3/2002 | Egilsson et al. | |
| 6,684,207 B1 | 1/2004 | Greenfield et al. | |
| 6,970,874 B2 * | 11/2005 | Egilsson et al. | 707/803 |
| 7,010,523 B2 | 3/2006 | Greenfield et al. | |
| 7,089,266 B2 * | 8/2006 | Stolte et al. | 707/769 |
| 7,275,024 B2 * | 9/2007 | Yeh et al. | 703/2 |
| 7,720,803 B2 * | 5/2010 | Unnebrink et al. | 707/601 |
| 8,086,598 B1 * | 12/2011 | Lamb et al. | 707/714 |
| 8,099,392 B2 * | 1/2012 | Paterson et al. | 707/654 |
| 2002/0194167 A1 * | 12/2002 | Bakalash et al. | 707/3 |
| 2003/0229610 A1 * | 12/2003 | Van Treeck | 707/1 |
| 2004/0122646 A1 | 6/2004 | Colossi et al. | |
| 2004/0139061 A1 * | 7/2004 | Colossi et al. | 707/3 |
| 2005/0065939 A1 * | 3/2005 | Miao | 707/100 |
| 2006/0259507 A1 | 11/2006 | Higuchi | |
| 2006/0271528 A1 * | 11/2006 | Gorelik | 707/3 |
| 2008/0033914 A1 | 2/2008 | Cherniack et al. | |

OTHER PUBLICATIONS

Microsoft Corporation, "Dimensional Tables", http://msdn.microsoft.com/en-us/library/aa905979 (SQL.80,printer).aspx, Downloaded Circa: Jun. 23, 2009, pp. 1-3.
"Craig Borysowich", "Identifying Dimension Tables(Data Warehouse)", http://it.toolbox.com/blogs/enterprise-solutions/identifying-dimension-tables-data-warehouse-20811, Downloaded Circa: Jun. 23, 2009, pp. 1-3.
"Ken Chu et al,", "Oracle Application Development Framework", Dated: Jun. 2006, pp. 1-1160.
"Lynn Munsinger", "Oracle Application Development Framework Overview", Dated: Feb. 2006, pp. 1-11.
"Oracle Corporation", "Oracle Business Intelligence Server Administration Guide—Version 10.1.3.2", Publication Date: Dec. 2006, pp. 1-432.

* cited by examiner

*Primary Examiner* — Charles Lu
(74) *Attorney, Agent, or Firm* — Narendra Reddy Thappeta

(57) ABSTRACT

An aspect of the present invention simplifies generating a star schema from a snowflake schema. In an embodiment, a user first specifies fact tables to be included in a star schema, and a synchronization tool inspects the snowflake schema to determine the dimension tables linked to the specified fact tables. The determined dimension tables are included in the star schema sought to be generated.

17 Claims, 10 Drawing Sheets

```
401: <ViewObject xmlns="http://xmlns.oracle.com/bc4j" Name="SalesSupplierCustomerView"
402:    SelectList="SalesSupplierCustomer.SUPPLIERID, SalesSupplierCustomer.CUSTOMERID,
403:    SalesSupplierCustomer.QTYSOLD, SalesSupplierCustomer.CCID1"
404:    FromList="SALES_SUPPLIER_CUSTOMER SalesSupplierCustomer" BindingStyle="OracleName"
405:    CustomQuery="false" PageIterMode="Full" UseGlueCode="false"
406:    ComponentClass="snowflakesales.SalesSupplierCustomerViewImpl">
407:    <EntityUsage Name="SalesSupplierCustomer" Entity="snowflakesales.SalesSupplierCustomer" />
408:    <ViewAttribute Name="Supplierid" IsNotNull="true" PrecisionRule="true" EntityAttrName="Supplierid"
409:       EntityUsage="SalesSupplierCustomer" AliasName="SUPPLIERID" />
410:    <ViewAttribute Name="Customerid" IsNotNull="true" PrecisionRule="true" EntityAttrName="Customerid"
411:       EntityUsage="SalesSupplierCustomer" AliasName="CUSTOMERID" />
412:    <ViewAttribute Name="Qtysold" IsNotNull="true" PrecisionRule="true" EntityAttrName="Qtysold"
413:       EntityUsage="SalesSupplierCustomer" AliasName="QTYSOLD" />
414:    <ViewAttribute Name="Supplierid" IsNotNull="true" PrecisionRule="true" EntityAttrName="Supplierid"
415:       EntityUsage="SalesSupplierCustomer" AliasName="CCID1" />
416:    <ViewLinkAccessor Name="CustomersView" ViewLink="snowflakesales.cust_salessuppcust_VL"
417:       Type="oracle.jbo.Row" IsUpdateable="false" />
418:    <ViewLinkAccessor Name="SuppliersView" ViewLink="snowflakesales.supp_salessuppcust_VL"
419:       Type="oracle.jbo.Row" IsUpdateable="false" />
420:    <ViewLinkAccessor Name="Kffvo1" ViewLink="snowflakesales.kffvo1_salessuppcust_VL"
421:       Type="oracle.jbo.Row" IsUpdateable="false" />
422: </ViewObject>
```

*FIG. 4A*

```
451: <ViewLink xmlns="http://xmlns.oracle.com/bc4j" Name="supp_salessuppcust_VL"
452:   EntityAssociation="snowflakesales.supp_salessuppcust_Assoc">
453:   <ViewLinkDefEnd Name="SalesSupplierCustomerView" Cardinality="-1"
454:     Owner="snowflakesales.SalesSupplierCustomerView" Source="true">
455:     <AttrArray Name="Attributes">
456:       <Item Value="snowflakesales.SalesSupplierCustomerView.Supplierid" />
457:     </AttrArray>
458:   </ViewLinkDefEnd>
459:   <ViewLinkDefEnd Name="SuppliersView" Cardinality="1" Owner="snowflakesales.SuppliersView">
460:     <AttrArray Name="Attributes">
461:       <Item Value="snowflakesales.SuppliersView.Supplierid" />
462:     </AttrArray>
463:   </ViewLinkDefEnd>
464: </ViewLink>
```

*FIG. 4B*

GENERATION OF STAR SCHEMAS FROM SNOWFLAKE SCHEMAS CONTAINING A LARGE NUMBER OF DIMENSIONS

BACKGROUND

1. Technical Field

The present disclosure relates to data warehousing and more specifically to generation of star schemas from snowflake schemas containing a large number of dimensions.

2. Related Art

Star schema (also known as a star join schema) refers to a type of schema in which tables are designed with redundancy of data. Star schemas organize data in terms of fact tables and dimension tables, with fact tables containing detailed data of interest (e.g., aggregated information or detailed counts, etc.,) and the dimension tables containing attributes (or fields) used to constrain and group data when performing data warehousing queries. Each fact table may be viewed as having multiple dimensions, with each dimension represented by a corresponding dimension table.

Due to such organization as fact tables and dimension tables, later retrieval of related data is simplified, thereby making star schemas suitable for environments, such as data warehousing, requiring analysis and/or reporting of data (which is unlikely to change).

Snowflake schema refers to a type of normalized star schema, where a dimension of a fact table is represented by multiple dimension tables. Such multiple dimension tables are organized in normalized form (without redundancy). Such organization is often chosen to avoid expending fields/space for data that is not of interest (or otherwise need not be stored) in the fact tables.

There is often a need to generate star schemas from snowflake schemas, particularly when there are a large number of dimensions and/or dimension tables.

BRIEF DESCRIPTION OF THE DRAWINGS

Example embodiments of the present invention will be described with reference to the accompanying drawings briefly described below.

FIG. 4A depicts a portion of a view object specified in an application development framework in one embodiment.

FIG. 4B depicts a portion of a view link (between view objects) specified in an application development framework in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention simplifies generating a star schema from a snowflake schema. In an embodiment, a user first specifies fact tables to be included in a star schema, and a synchronization tool inspects the snowflake schema to determine the dimension tables linked to the specified fact tables. The determined dimension tables are included in the star schema sought to be generated.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example Environment

Figure 1:
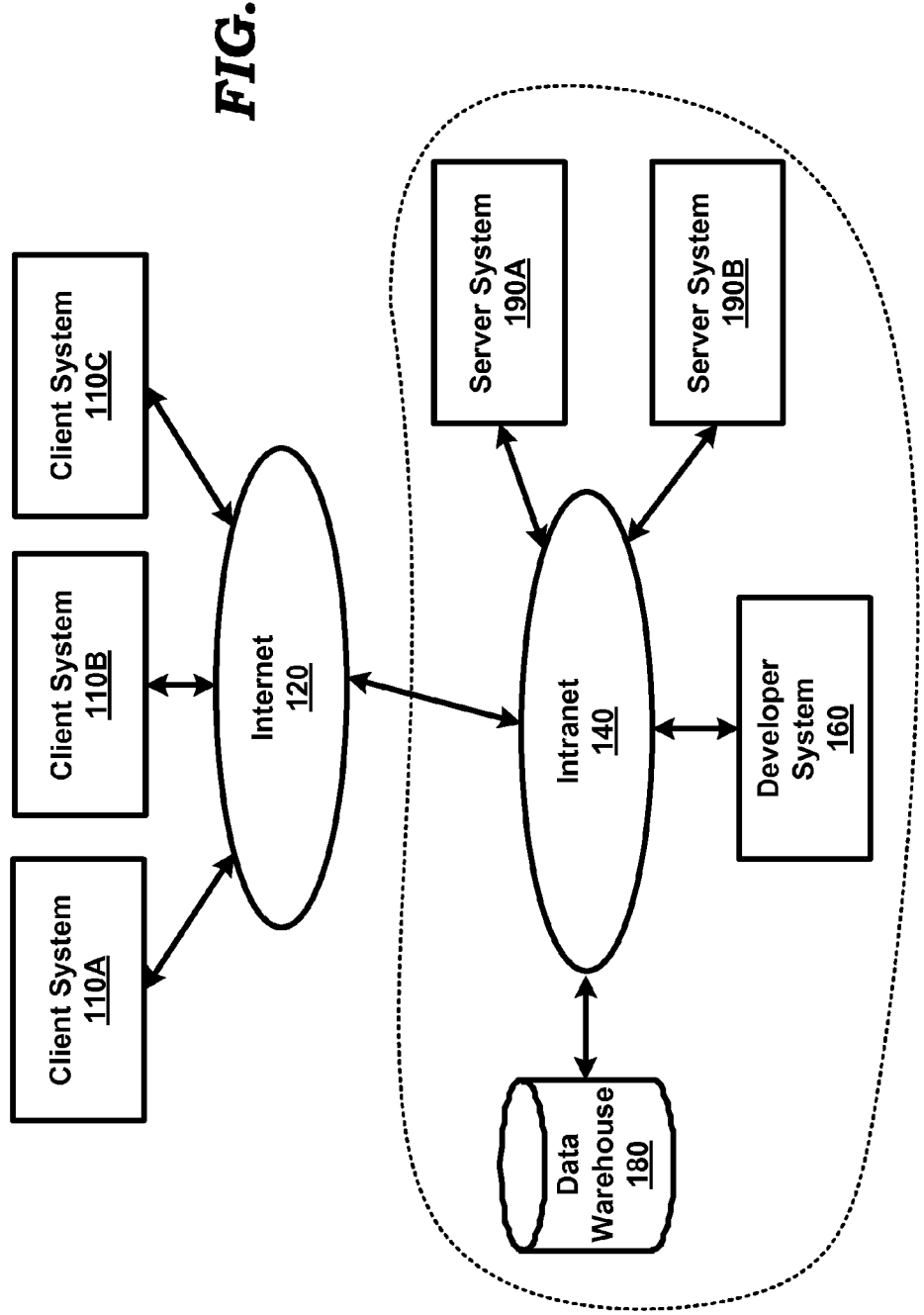
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing client systems 110A-110C, Internet 120, intranet 140, developer system 160, data warehouse 180 and server systems 190A-190B.

Merely for illustration, only representative number/type of systems is shown in the Figure. Many environments often contain many more systems, both in number and type, depending on the purpose for which the environment is designed. Each system/device of FIG. 1 is described below in further detail.

Intranet 140 represents a network providing connectivity between server systems 190A-190B, data warehouse 180, and developer system 160, all provided within an enterprise (shown with dotted boundaries). Internet 120 extends the connectivity of these (and other systems of the enterprise) with external systems such as client systems 110A-110C.

Each of intranet 140 and Internet 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Data warehouse 180 represents a non-volatile storage facilitating storage and retrieval of a collection of data by one or more enterprise applications executing in server systems 190A-190B (typically while processing various client requests). The data in data warehouse 180 is maintained organized as a star/snowflake schema, and accordingly simplifies the retrieval of related data for analysis and/or reporting by the enterprise applications.

In one embodiment, data warehouse 180 is implemented using relational database technologies and therefore provides storage and retrieval of data using structured queries such as SQL (Structured Query Language). SQL refers to a special-purpose, generally non-procedural language that supports the definition, manipulation, and control of data in systems implementing relational database technologies. However, data warehouse 180 can be implemented using other technologies (e.g., procedural language, hierarchical databases) in alternative embodiments.

Each of client systems 110A-110C represents a system such as a personal computer, workstation, mobile station, etc., used by end users to generate (client) requests to business/enterprise applications executing in server systems 190A-190B. The requests may be generated using appropriate interfaces. In general, a client system requests an application for performing desired tasks and receives corresponding responses containing the results of performance of the requested tasks.

Each of server systems 190A-190B represents a server, such as a web/application server, executing business/enterprise applications capable of performing tasks requested by end users using one of client systems 110A-110C. A server system may perform the tasks on data maintained internally or on external data (stored in data warehouse 180) and then send the result of performance of the tasks to the requesting client system.

In one embodiment, business applications are designed to facilitate end users (such as managers, business analysts, etc.) to perform various analyses as well as to generate various reports based on the data stored in data warehouse 180. An example of such a business application is Oracle Business Intelligence Suite Enterprise Edition Plus (OBIEE) available from Oracle Corporation (the assignee of the subject application).

The need for generating star schemas from snowflake schemas in such an environment is described below with examples.

3. Need for Generating a Star Schema from a Snowflake Schema

Figure 2A:
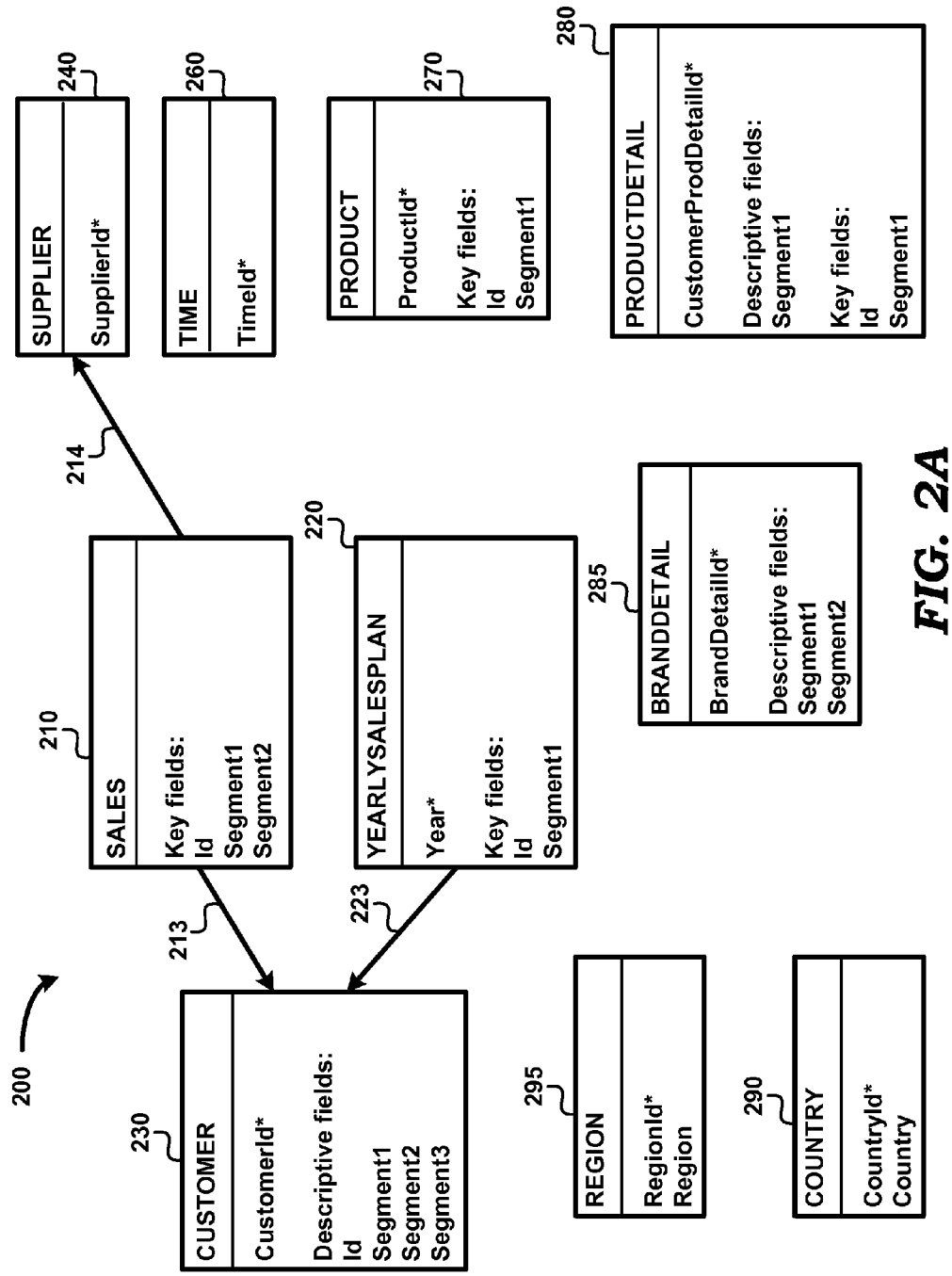
FIG. 2A depicts a portion of a star schema according to which data is initially maintained in a data warehouse in one embodiment.

FIG. 2A depicts a portion of a star schema (200) according to which data is initially maintained in a data warehouse (180) in one embodiment. Star schema 200 may represent the schema of the data stored in data warehouse 180 during the installation of a business application in server systems 190A-190B.

Star schema 200 is shown containing multiple fact and dimension tables. Each table is shown as a corresponding box having the name of the table, the names of some of the columns/fields contained in the table (with the primary key of the table indicated by *) and also the dynamic fields (named as "Segment1", "Segment2", "Segment3", etc.) that may be configured by developers/users. The "Key fields" may be configured to point to the primary key columns/fields of other tables, while the "Descriptive fields" may be configured to point to non-key columns/fields of other tables.

Thus, star schema 200 is shown having two fact tables (210 and 220) respectively named "SALES" and "YEARLYSALESPLAN". Fact table 210 is shown linked (arrows 213 and 214) to dimension tables 230 and 240 respectively named "CUSTOMER" and "SUPPLIER". The linking of the tables may be performed by including the primary keys "CustomerId" and "SuppliedId" of dimension tables 230 and 240 as corresponding foreign keys (not shown) in fact table 210 as is well known in the relevant arts.

The links generally are specified according to the desired reports that are sought to be generated based on star schema 200. For example, links 213 and 214 may be specified when reports such as "SALES by SUPPLIER", "SALES by CUSTOMER" (in general a report of the facts in the fact table by one or more dimensions) are desired to be generated.

Similarly, fact table 220 "YEARLYSALESPLAN" is shown linked (223) to the dimension table 230 "CUSTOMER". Other dimension tables 260 "TIME", 270 "PRODUCT", 280 "PRODUCTDETAIL", 285 "BRANDDETAIL", 290 "COUNTRY" and 295 "REGION", though not associated with any of the fact tables, are also shown included in star schema 200.

It may be observed that the fact and dimension tables contain dynamic key/descriptive fields that may be configured by users/developers (using developer system 160) to create links between the various tables in star schema 200. The configuration of the dynamic fields may result in the creation of a snowflake schema as described below with examples.

Figure 2B:
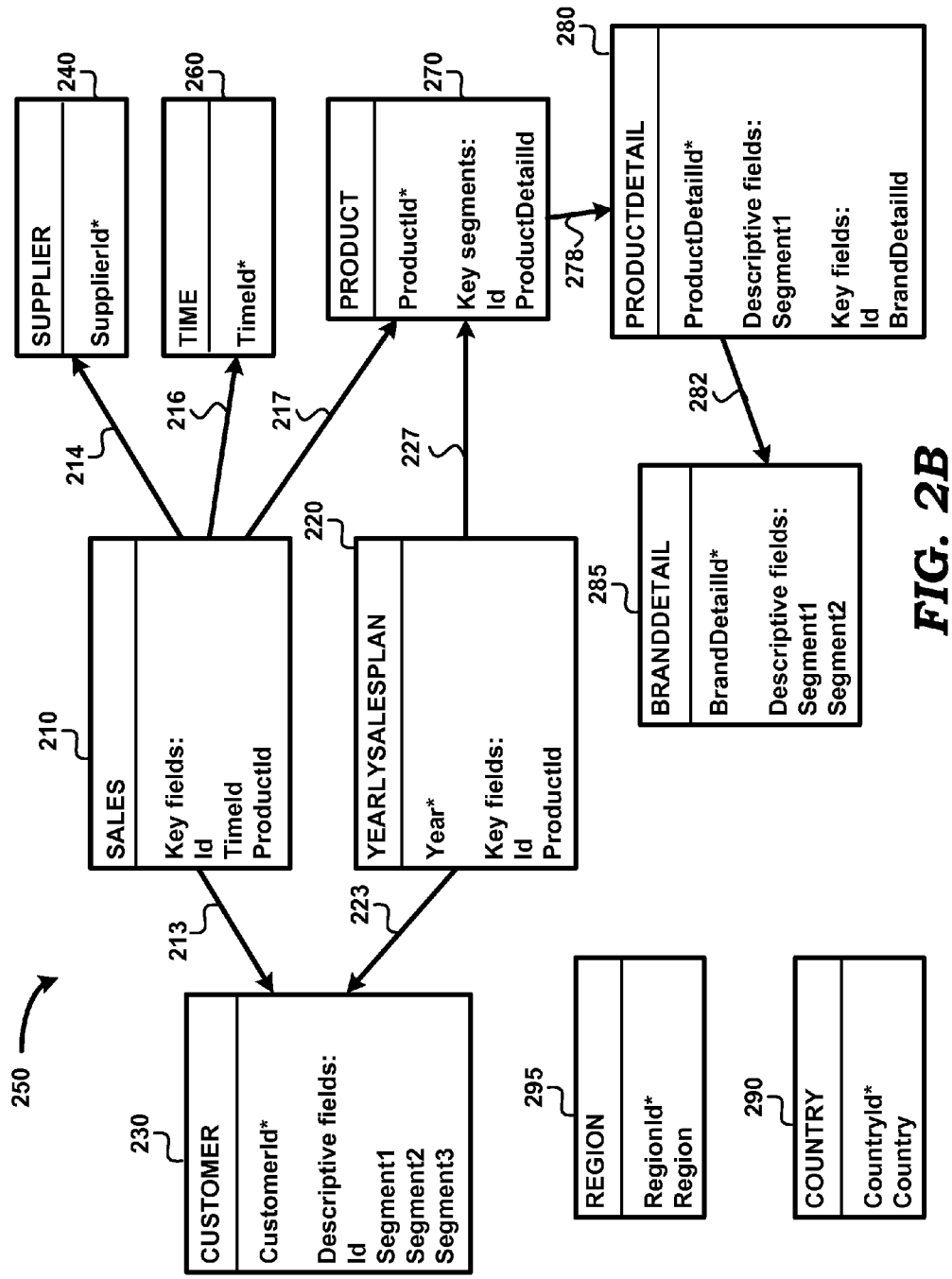
FIG. 2B depicts a portion of a snowflake schema created by configuration of dynamic fields of a star schema in one embodiment.

FIG. 2B depicts a portion of a snowflake schema (250) created by configuration of dynamic fields of a star schema (200) in one embodiment. Similar numbers are used in FIGS. 2A and 2B to represent the same table/link and accordingly the description of the tables/links in not repeated for conciseness.

It may be observed that new links 216 and 217 have been created between fact table 210 ("SALES") and dimension tables 260 and 270 (respectively named "TIME" and "PRODUCT") by including their primary keys "TimeId" and "ProductId" (as foreign keys) in the "Key fields" provided in fact table 210. Similarly, links 227, 278 and 282 are shown associating the dimension tables 270, 280 and 285 with fact table 220 by configuring the corresponding dynamic fields to point to the desired primary keys. It should be noted that dimension table 230 is not shown linked to dimension tables 290 and 295, since the dynamic fields in table 230 are defined to be descriptive and point to columns that are not primary keys.

It may be appreciated that dimension tables 280 and 285 are not directly associated with fact table 220 ("YEARLYSALESPLAN") as would be necessitated by star schemas. Thus, the association of the different dimension tables renders the schema of FIG. 2B to be a snowflake schema (250), with the dimension tables "PRODUCT", "PRODUCTDETAIL" and "BRANDDETAIL" forming the set of related tables corresponding to a single dimension ("product") for the fact table "YEARLYSALESPLAN"). The different dimension tables may be viewed as being at a different distances (in terms of the number of links) from the fact table. For example, dimension table 285 "BRANDDETAIL" may be viewed as being at a distance of 3 links from fact table 220.

Thus, a snowflake schema may be created by configuring the dynamic fields provided in a star schema in data warehouse 180. However, business applications executing in server systems 190A-190B may require the data in data warehouse 180 to be organized as a star schema, and accordingly it may be desirable that data organized as a snowflake schema (250) be converted to data organized as a corresponding star schema.

In one prior embodiment, a user may be required to specify the set of tables (organized as a snowflake schema) to be included in the target star schema, and the tool generates the target star schema, as well as converting the data to the target star schema. An example of such a tool is the Admintool available as a part of Oracle Business Intelligence Suite Enterprise Edition Plus (OBIEE).

One challenge in such an environment is the requirement that a user/developer manually select the set of fact/dimension tables (in snowflake schema) that are to be included in the star schema sought to be generated. Such manual selection of the tables may necessitate the developer/user to spend considerable amount of time/resources in the selection of desired fact/dimension tables, in particular, when the number of dimensions (and correspondingly the number of tables) is large.

Missing any pertinent tables may lead to reduced functionality. For example, if a developer misses including dimension table 285 in the star schema generated, end users using client systems 110A-110C may be unable to generate reports such as "YEARLYSALESPLAN by BRANDDETAIL", thereby reducing the analysis/reports that can be provided based on the data in data warehouse 180.

Thus, it may be desirable that the generation of star schemas from snowflake schemas be simplified, in particular when the snowflake schemas contain a large number of dimensions. Several aspects of the present invention simplify the generation of star schema from snowflake schemas as described below with examples. In one embodiment, such features are obtained by operation of a synchronization tool (formed by one or more processors executing appropriate software instructions in one of server systems 190A-190B or in developer system 160), and accordingly the description below is provided with respect to the synchronization tool.

4. Simplifying Generation of Star Schemas

Figure 3:
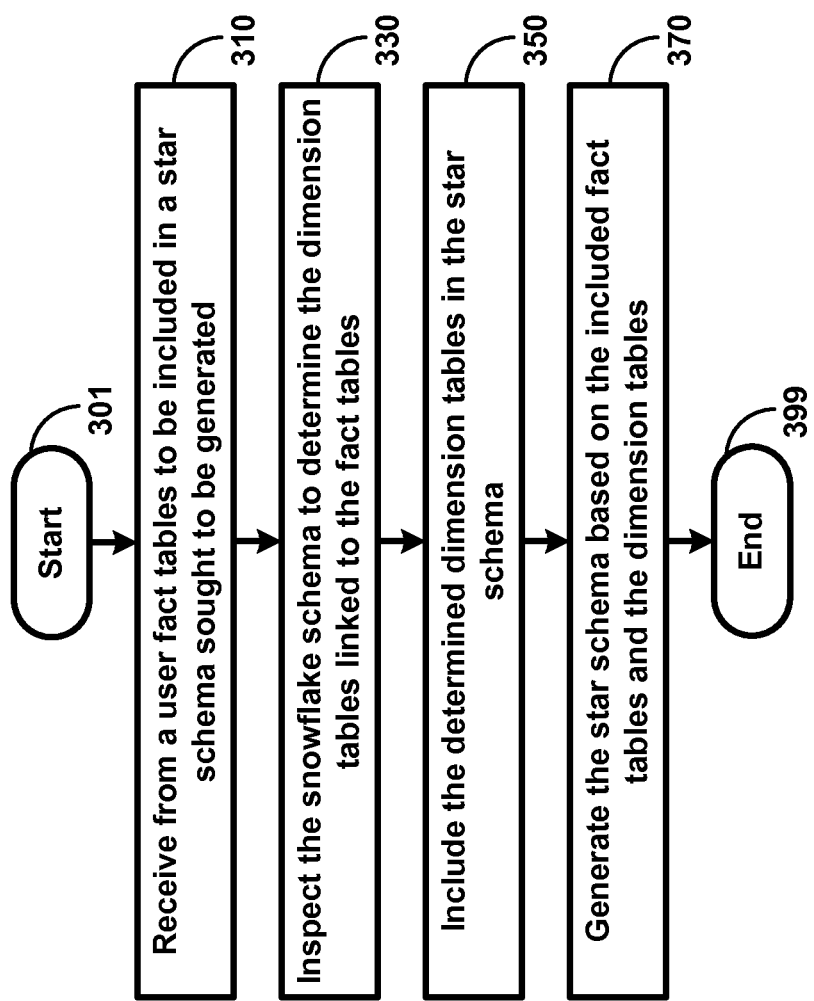
FIG. 3 is a flowchart illustrating the manner in which generation of star schemas from snowflake schemas is simplified, according to an aspect of the present invention.

FIG. 3 is a flowchart illustrating the manner in which generation of star schemas from snowflake schemas is simplified, according to an aspect of the present invention. The flowchart is described with respect to FIGS. 1, 2A and 2B merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 301, in which control immediately passes to step 310.

In step 310, the synchronization tool receives, from a user, the set of fact tables to be included in a star schema sought to be generated. The synchronization tool may receive the unique identifiers and/or the names of the fact tables to be included. For example, with respect to FIG. 2B, the synchronization tool may receive the names of fact tables 210 and 220, namely, "SALES" and "YEARLYSALESPLAN".

In step 330, the synchronization tool inspects the snowflake schema to determine the dimension tables linked to the fact tables (received from the user). The inspection of the snowflake schema may correspond to checking of the internal structures of data warehouse 180, for example, to identify the primary/foreign keys and accordingly the links defined between the tables. Alternatively, the inspection of the snowflake schema may correspond to checking the configuration data (representing similar information) maintained by the business application.

The synchronization tool may determine all the dimension tables linked to the fact tables, including the multiple tables corresponding to a single dimension. Thus, for snowflake schema 250 shown in FIG. 2B, the synchronization tool may determine the dimension tables 230, 240, 260, 270, 280 and 285 as being linked to the fact tables 210 and 220 specified by the user.

In step 350, the synchronization tool includes the determined dimension tables (in step 330) in the star schema sought to be generated. The inclusion of the dimension tables' determined based on inspection of the snowflake schema ensures that all the dimension tables that are linked to the fact tables (specified by the user) are also present in the star schema generated.

In step 370, the star schema based on the included fact tables (in step 310) and the dimension tables (in step 350) is generated. Once the fact tables and dimension tables are conveniently identified as described above, the star schema can be generated using tools such as that noted above. The flow chart ends in step 399.

Thus, by requiring the user to provide only the set of fact tables to be included, and then determining and including the associated/linked dimension tables (without user intervention), the process of generating the star schemas from snowflake schemas is simplified. Furthermore, the inclusion of all the determined dimension tables (without manual selection by the user/developer) avoids the issue of missing dimension tables.

The description is continued illustrating the manner in which the steps of FIG. 3 is implemented in one embodiment.

5. Example Implementation

FIGS. 4A-4B, 5 and 6A-6B together illustrates the manner in which the generation of star schemas from snowflake schemas is simplified in one embodiment. The description is continued assuming that the business application is developed using Oracle Application Development Framework (hereafter "application development framework") available as part of JDeveloper 10.1.3, a development tool available from Oracle Corporation. It should however be appreciated that several features of the present invention can be implemented in various other environments.

As is well known, application development framework (ADF) enables a business application to be developed in the form of multiple layers such as a view layer, a controller layer, an abstraction layer, a business service layer, etc. Each layer contains code modules/files implementing desired logic according to pre-defined specification. For example, the business services layer contains code modules that provide access to data (to the higher layers) from various data sources and handles business logic.

In one embodiment, the business services layer contains metadata objects that form a layer of abstraction over the tables present in data warehouse 180. One type of metadata objects is a view object which represents a code module designed to execute a corresponding SQL query and to simplify working with the results of the query. The associated SQL query may be used to perform various operations (such as join, project, filter, sort, and/or aggregate) on the data stored in data warehouse 180 as desired by the developer of the application.

The view objects may be organized in the form of a schema (by linking the view objects) to simplify retrieval of data for code modules in the higher layers of the business application. The linking of the view objects is performed using another type of metadata objects termed view links. Thus, in a scenario that the view objects are organized as a star/snowflake schema, the view objects may define the corresponding fact and dimension tables and the view links may define the corresponding links between the tables.

The manner in which star/snowflake schemas are specified in the application development framework is first described, followed by the description of determination of the dimension tables linked to the fact tables selected by a user.

6. Specifying Star/Snowflake Schemas

FIGS. 4A-4B depicts the manner in which star/snowflake schemas are specified in an application development environment in one embodiment. The details of the view objects and view links are shown specified in the form of extensible markup language (XML) data according to a convention consistent with the implementation of the application development framework.

FIG. 4A depicts a portion of a view object specified in an application development framework in one embodiment. Lines 401-422 (tag "<ViewObject>") specify the details of a view object, with the attribute "Name" in line 401 specifying the name of the view object as "SalesSupplierCustomerView" (and may correspond to fact table 210 "SALES").

Lines 402-403 (attribute "SelectList") indicate the specific columns that are to be retrieved from the specific tables (indicated by attribute "FromList" in line 404) contained in data warehouse 180. Line 407 (tag "<EntityUsage>") specifies the name of the entity object to be created and made available to the higher layers of the business application. Each of lines 408-409, 410-411, 412-413, and 414-415 (tag "<ViewAttribute>") specifies the manner in which a column retrieved from the data warehouse is to be mapped to an attribute contained in the entity object.

Each of lines 416-417, 418-419 and 420-421 (tag "<ViewLinkAccessor>") specifies the corresponding information to be retrieved based on a view link to other view objects. The manner in which a corresponding view link is specified is described in detail below.

FIG. 4B depicts a portion of a view link (between view objects) specified in an application development framework in one embodiment. Lines 451-464 (tag "<ViewLink>") specify the details of a view link, with the attribute "Name" in line 451 specifying the name of the view link as "supp_salessuppcust_VL" (the same name specified in line 418).

Lines 453-458 (tag "<ViewLinkDefEnd>") specifies that one end of the view link is the attribute "SupplierId" (line 456) of the view object "SalesSupplierCustomerView" (attribute "Name" in line 453), while lines 459-463 specifies that the other end of the view link is the attribute "SupplierId" (line 461) of the view object "SuppliersView" (in line 459), which may correspond to dimension table 240 "SUPPLIERS". Thus, view link "supp_sales_suppcust_VL" may correspond to link 214 shown between fact table 210 and dimension table 240.

The view objects corresponding to the different fact and dimension tables and the corresponding links shown in snowflake schema 250 may be similarly defined. It may be appreciated that some of the view links may be created in response to the user/developer specifying the corresponding primary keys for the dynamic fields associated with a view object.

For example, a view link named "product_yearlysalesplan_VL" (corresponding to link 227) having one end defined as the attribute "ProductId" in the "YearlySalesPlanView" (view object corresponding to fact table 220) and the other end defined as the attribute "ProductId" in the "ProductView" (view object corresponding to dimension table 270) may be created when a user/developer configures a key field in fact table 220 is to point to the "ProductId" primary key of the "ProductView" view object. The other view links 216, 217, 278, and 282 of snowflake schema 250 may similarly be defined, in response to the user/developer configuring the various dynamic fields.

Thus, a star/snowflake schema (250) is specified in the application development framework as corresponding set of definitions of view objects and view links. Accordingly, the set of definitions of the view objects and view links may be inspected for determining the dimension tables to be included in the star schema sought to be generated. The manner in which such an inspection of the view objects/view links may be performed is described below with examples.

7. Inspecting a Snowflake Schema

Figure 5:
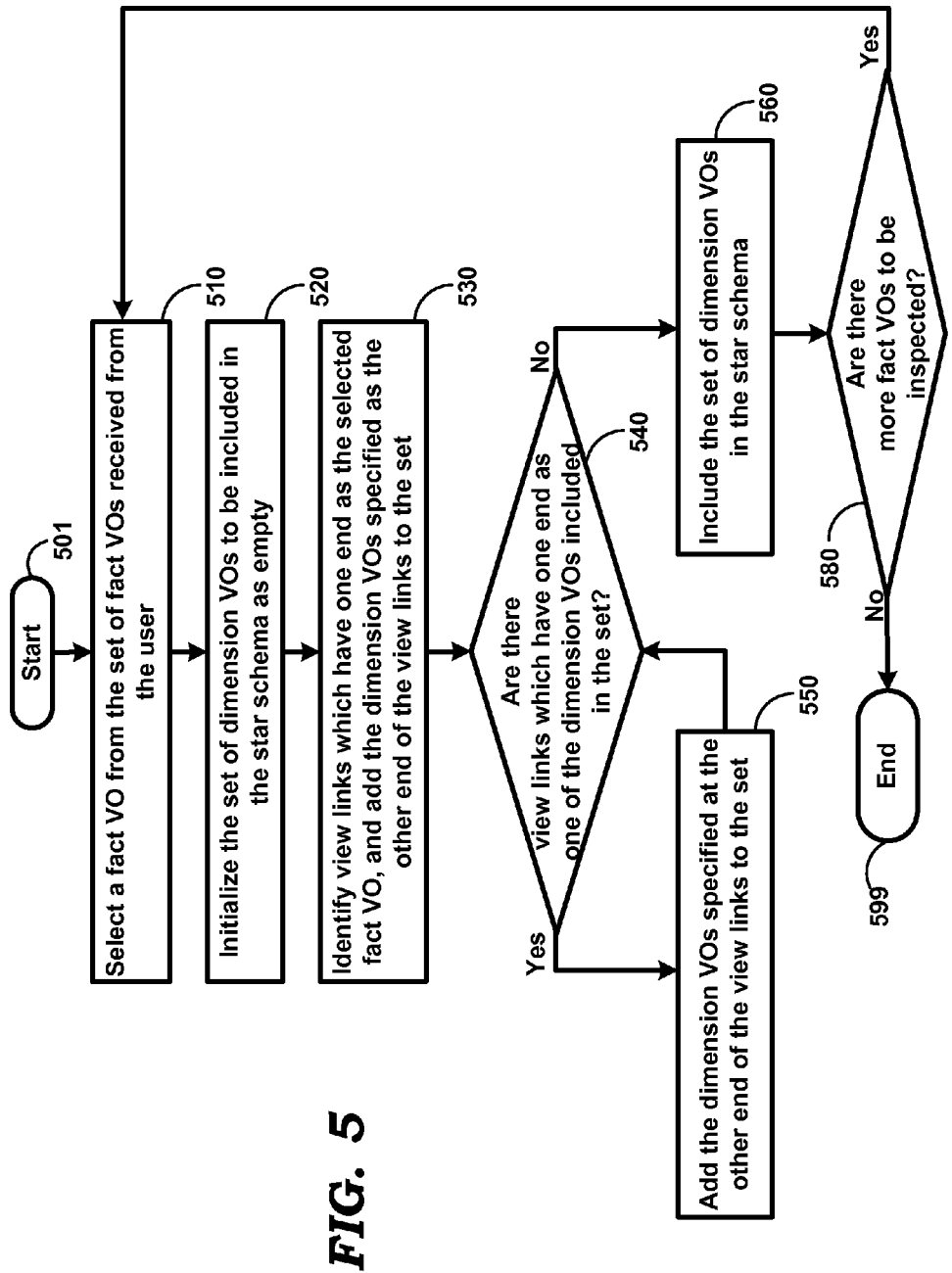
FIG. 5 is a flowchart illustrating the manner in which a snowflake schema specified in an application development framework is inspected in one embodiment.

FIG. 5 is a flowchart illustrating the manner in which a snowflake schema (250) specified in an application development framework is inspected in one embodiment. The flowchart is described with respect to FIGS. 1, 2B, 4A and 4B merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 501, in which control immediately passes to step 510.

In step 510, the synchronization tool selects a fact view object (VO) from the set of fact VOs received from the user. For example, assuming that the set of fact VOs received from the user includes the VOs "SalesSupplierCustomerView" and "YearlySalesPlanView" (fact tables 210 and 220) the synchronization tool may select the "SalesSupplierCustomerView" as the VO to be inspected.

In step 520, the synchronization tool initializes the set of dimension VOs to be included (by processing of the selected fact VO) in the star schema as empty. In step 530, the synchronization tool identifies view links which have one end as the selected fact VO, and adds the dimension VOs specified as the other end of the view links to the set. The synchronization tool may determine view links that have one end as the selected fact VO based on the definition of the fact VO. Thus, the synchronization tool may inspect (parse) the definition of the selected fact VO "SalesSupplierCustomerView" shown in FIG. 4A and then identify that there are three view links associated with the VO (based on the three occurrences of the tag "<ViewLinkAccessor>" in lines 416-417, 418-419 and 420-421).

The synchronization tool may then determine the dimension VOs to be added to the set based on the definitions of the view links specified in the definition of the selected fact VO. For example, the synchronization tool may inspect (parse) the definition of view link "supp_sales_suppcust_VL" shown in FIG. 4B to verify that the view link has one end as the selected fact VO "SalesSupplierCustomerView" by inspecting (parsing lines 453-458), and then adds the dimension VO "SuppliersView" specified as the other end of the view link (lines 459-463) to the set. The synchronization tool may similarly add the dimension VOs corresponding to the dimension tables 230, 260 and 270 to the set based on inspections/parsing of the definitions of the selected view object and the corresponding view links.

In step 540, the synchronization tool checks whether there exists view links (that have not already been inspected and) which have one end as one of the dimension VOs included in the set. The synchronization tool may parse the definitions of the view links specified for snowflake schema 250 and then check whether any one end is specified as any one of the dimension VOs already included in the set (similar to step 530). Control passes to step 550 if there exists at least one such view link, and to step 560 otherwise.

In step 550, the synchronization tool adds the dimension VOs specified at the other end of the view links to the set, and control passes back to step 540. It may be appreciated that only new dimension VOs that are not already included in the set are required to be added in step 550. Accordingly, steps 540 and 550 execute in a loop to identify the dimension VOs at different distances (two links, three links, etc.) from the fact VOs.

It should be noted that the dimension VOs at a distance of a single/one link is already determined in step 530. Thus, for the fact VO "SalesSupplierCustomerView", all the dimension tables are identifies in step 530, and control passes to step 560 since there are no dimension tables at a distance of 2 from fact table 210 in snowflake schema 250.

Though steps 540 and 550 are described as being performed in a loop/iterative manner, it may be appreciated that the corresponding features may be achieved using other techniques such as recursion, as will be apparent to one skilled in the relevant arts.

In step 560, the synchronization tool includes the set of dimension VOs in the star schema sought to be generated. Thus, when the fact table 210 is selected, the set of dimension VOs for the tables 230, 240, 260 and 270 is included in the star schema.

In step 580, the synchronization tool checks whether there are more (at least one) fact VOs to be inspected in the set of fact VOs received from the user. Since there is at least one fact VO namely "YearlySalesPlanView" that is not inspected, control passed to step 510.

The synchronization tool then selects the next fact VO "YearlySalesPlanView" in step 510 and in step 530 identifies and adds the dimension VOs for tables 230 and 270 (distance of 1 link) to the set. The synchronization tool identifies and adds the dimension VO for table 280 (distance of 2 links) after the first iteration of steps 540 and 550, and the dimension VO for table 285 (distance of 3 links) after the second iteration of steps 540 and 550. Control passes to step 560 during the third iteration of step 540, since there are no view links at a distance of 4 in snowflake schema 250. The synchronization tool includes the set of dimension VOs for the tables 230, 270, 280 and 285 in the star schema in step 560.

Once all the fact VOs in the set of fact VOs received from the user are inspected and the corresponding determined set of dimension VOs included in the star schema, control passes from step 580 to step 599, where the flowchart ends. Thus, for the above noted example, the flowchart ends after the inspection of the fact VOs for the tables 210 and 220 is completed.

It should be noted that only a small number of tables have been shown in the examples of FIGS. 2A and 2B for ease of understanding. However, typical deployments contain many hundreds/thousands of fact/dimension tables, and accordingly the flowchart of FIG. 5 is operative only for the specific fact tables selected by the user. As a result, the corresponding dimension tables are reliably included in the star schema (sought to be generated).

The description is continued with respect to a user interface using which some of the features described above can be made operative.

8. Sample Interface

Figure 6A:
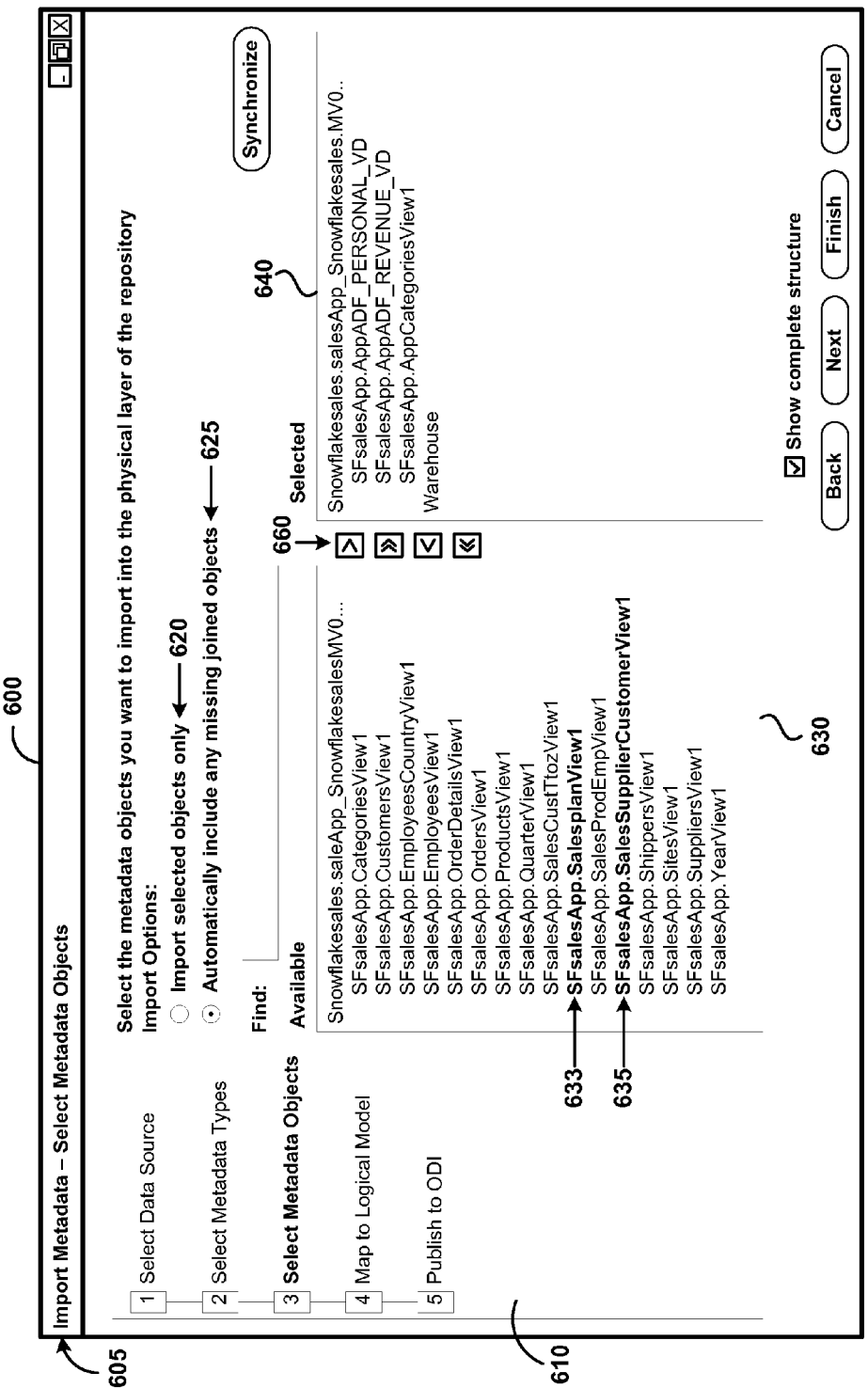
FIG. 6A depicts a sample user interface for generating star schemas from snowflake schemas in one embodiment.

FIG. 6A depicts a sample user interface for generating star schemas from snowflake schemas in one embodiment. Display area 600 is provided by a business application designed to operate with star schemas, and accordingly the metadata objects forming the snowflake schema are viewed as being imported into the business application (as indicated by text 605).

The description is continued assuming that display area 600 is provide by the Admintool available as a part of Oracle Business Intelligence Suite Enterprise Edition Plus (OBIEE). However, the features can be implemented in various other environments, as will be apparent to one skilled in the relevant arts by reading the disclosure provided herein.

Display area 600 may be displayed on a display unit (not shown) associated with developer system 160 or server systems 190A-190B. Display area 610 depicts the steps to be performed for generating a star schema from a snowflake schema. Display area 610 indicates that the steps of selecting a data source (storing data organized as a snowflake schema, for example, data warehouse 180) and selecting the metadata types are completed and the current step (3) is that of selecting the metadata objects, in particular the VOs (representing the fact and dimension tables) to be included in the star schema sought to be generated.

Options 620 and 625 (provided according to an aspect of the present invention) enable a user to specify whether only the selected view objects are to be imported (included in the star schema) or whether any missing joined objects (such as columns, dimensions, links that are not manually selected) are to be included automatically, when the corresponding facts VOs are selected for importing (included in the star schema). It may be observed that option 625 is shown selected indicating that missing objects are to be automatically included.

List box 630 displays a list of fact/dimension VOs retrieved from (or defined for) the selected data source in step 1 (not shown), while list box 640 displays the current list of VOs already present/included in the star schema (currently being used by the business application), as well as those VOs that have been selected by the user/developer for inclusion in the star schema (sought to be generated). It should be appreciated that list boxes 630 and 640 would contain a large number of VOs, though only a few are shown there for ease of understanding.

A user/developer may select the desired fact/dimension VOs from list box 630 and then click on the buttons labeled ">" and ">>" in display area 660 to move the selected VOs to list box 640 (for inclusion in the star schema sought to be generated). The user/developer may also remove VOs from the star schema by selecting the desired VOs from list box 640 and clicking on the buttons labeled "<" and "<<" in display area 660.

In the scenario that option 625 is selected, on clicking the buttons ">" and ">>", the user selected fact VOs (for example, items 633 and 635 in list box 630) as well as the joined missing objects such as the dimension VOs linked to the selected fact VOs in the snowflake schema (according to which the data source selected in step 1 is organized) are also included in list box 640. The dimension VOs linked to the selected fact VOs are determined by performing the steps of FIG. 5.

In particular, the synchronization tool is executed with the selected set of fact VOs in list box 630 as the inputs (along with the details of data source selected in step 1). The synchronization tool then inspects the snowflake schema of the data source (based on the details provided as inputs) to determine the dimension VOs that are linked to the fact VOs. The synchronization tool then includes the determined dimension VOs (as well as the selected fact VOs) in list box 640 (for the star schema sought to be generated).

Figure 6B:
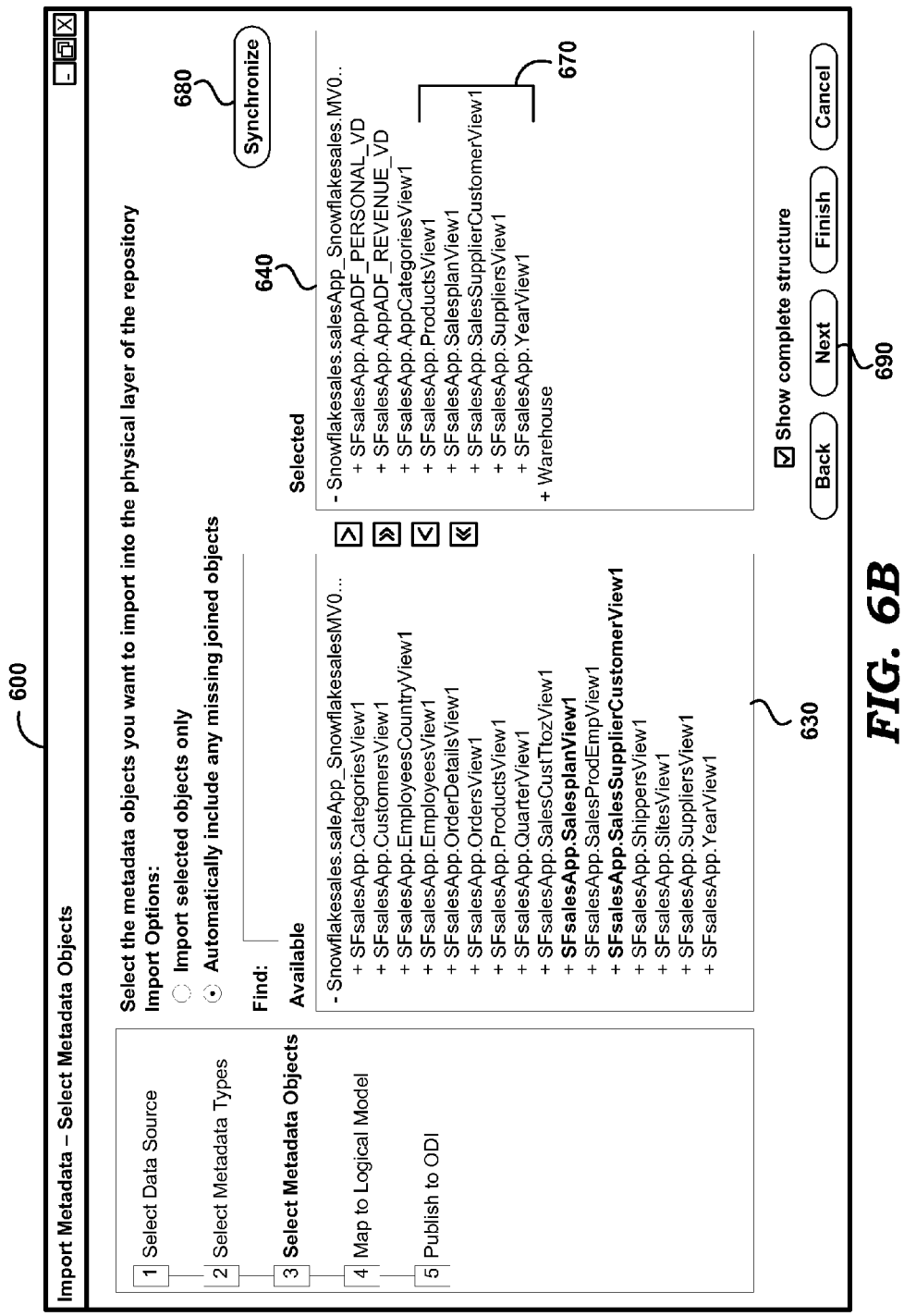
FIG. 6B depicts a sample interface for generating star schemas from snowflake schemas after the inclusion of dimension tables (determined according to several aspects of the present invention) linked to fact tables (selected by a user/developer) in one embodiment.

FIG. 6B depicts both the VOs selected by the user in FIG. 6A and the VOs included by the operation of steps of FIG. 5 in an embodiment. The Figure further depicts the manner in which a user may cause the generation of the star schema based on all the VOs shown in list box 640.

Thus, list box 640 is shown updated to include a new set of VOs in list portion 670, which includes the fact VOs (633 and 635) selected by the user/developer in list box 630 in the interface of FIG. 6A, and also the dimension VOs (e.g., "ProductsView1", "YearView1") linked to the selected fact VOs that have been identified by the synchronization tool based on the inspection of the snowflake schema.

Synchronize button 680, provided according to an aspect of the present invention, enables the importing of missing joined objects for the fact VOs already present in the star schema (currently used by the business application and not which is sought to be generated) instead of user selected fact VOs in list box 630. This feature may be understood assuming that the list box 640 of FIG. 6A displays the VOs of a pre-existing (e.g., star schema 200 of FIG. 2A formed at the time of installation of the business application) star schema and on the user/developer clicking synchronize button 680, the flow chart of FIG. 5 is operative with the fact VOs (already present in the star schema as inputs) displayed in list box 640 of FIG. 6A.

The resultant set of dimension VOs identified based on the inspection of the snowflake schema is then included in list box 640 by the synchronization tool (not shown). It may be appreciated that any new dimension VOs added, for example using the dynamic fields described above, may be uncovered and included in list box 640. It may be further appreciated that a developer may modify the keys pointed to by the dynamic fields of FIG. 2A to create a different snowflake schema (i.e., something different from that shown in FIG. 2B). The user may operate the interfaces of FIGS. 6A and 6B to detect such added dimension VOs/tables for inclusion in the star schema.

The user/developer may then click on Next button 690 to go to step 4 ("Map to Logical Model" as shown in display area 610). The user may then specify which VOs correspond to facts, which VOs correspond to dimensions, and the links (in particular the columns to be used for linking) between the VOs (defining the star schema sought to be generated). The business application (Admintool) then generates the star schema based on the included fact VOs, dimension VOs (as indicated in list box 640), and user input data (of step 4). It may be appreciated that the user/developer is not required to manually select the determined dimension tables from list box 630 and accordingly, the generation of star schemas from snowflake schemas is simplified.

It should be further appreciated that the features described above can be implemented in various embodiments as a desired combination of one or more of hardware, executable modules, and firmware. The description is continued with respect to an embodiment in which various features are operative when executable modules are executed.

9. Digital Processing System

Figure 7:
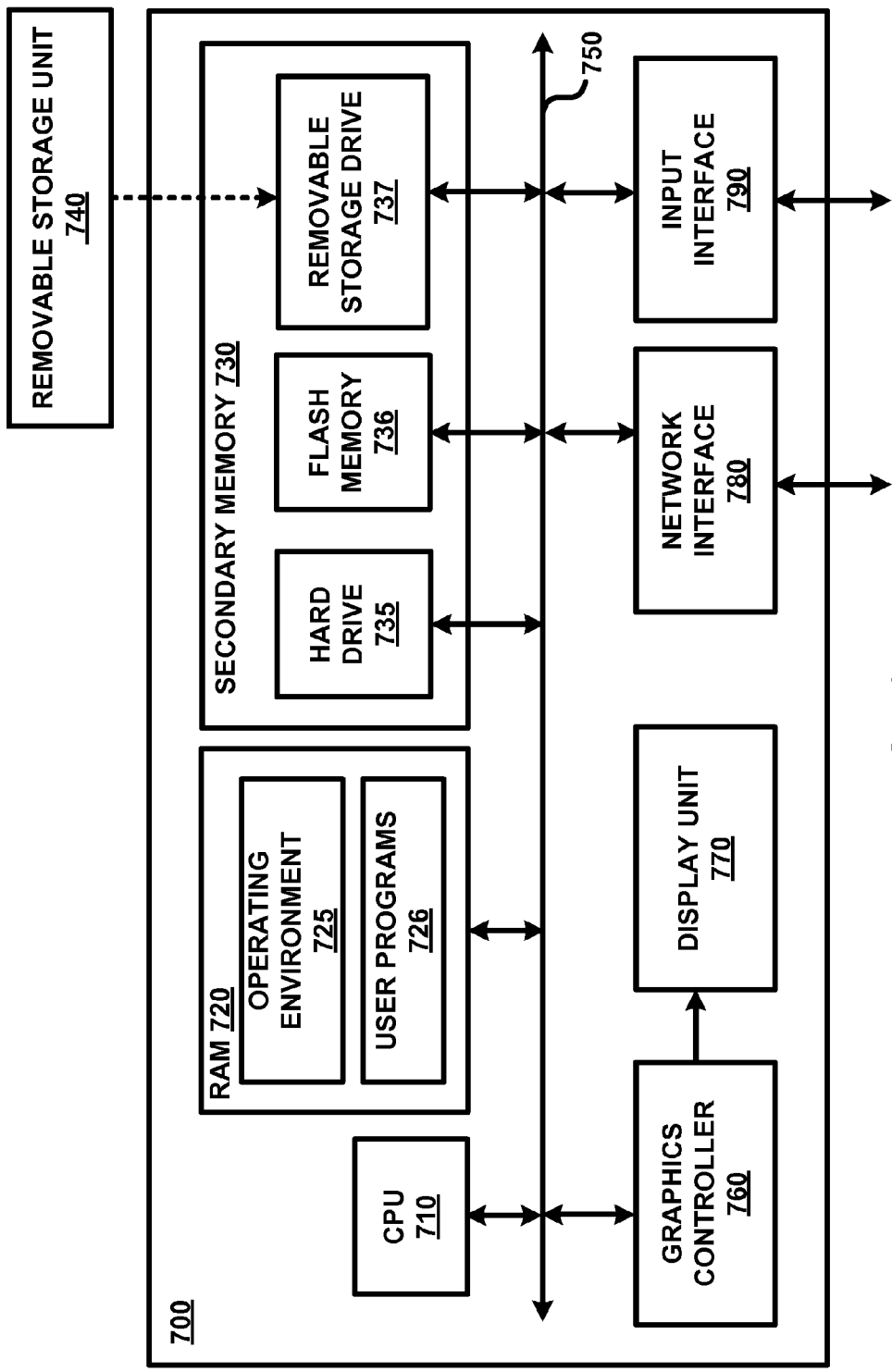
FIG. 7 is a block diagram illustrating the details of digital processing system in which various aspects of the present invention are operative by execution of appropriate executable modules.

FIG. 7 is a block diagram illustrating the details of digital processing system 700 in which various aspects of the present invention are operative by execution of appropriate executable modules. Digital processing system 700 may correspond to any system (such as developer system 160 or one of server systems 190A-190B) executing the synchronization tool.

Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting operating environment 725 and/or other user programs 726 (such as applications, web/application server software, RDBMS, etc.). In addition to operating environment 725, RAM 720 may contain other software programs such as device drivers, virtual machines, etc., which provide a (common) run time environment for execution of other/user programs.

Graphics controller 760 generates display signals (e.g., in RGB format) to display unit 770 based on data/instructions received from CPU 710. Display unit 770 contains a display screen to display the images defined by the display signals (for example, the interfaces of FIGS. 6A and 6B). Input interface 790 may correspond to a keyboard and a pointing device (e.g., touch-pad, mouse) and may be used to provide inputs (for example, as required by the interfaces of FIGS. 6A and 6B). Network interface 780 provides connectivity to a network (e.g., using Internet Protocol), and may be used to communicate with other systems connected to the network.

Secondary memory 730 may contain hard drive 735, flash memory 736, and removable storage drive 737. Secondary memory 730 may store the data (for example, portions of the definitions of the metadata objects as shown in FIGS. 4A and 5B) and software instructions (for example, implementing the flowchart shown in FIG. 5), which enable digital processing system 700 to provide several features in accordance with the present invention.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of supporting business applications to operate based on data stored in data warehouses, said method comprising:

storing data in a plurality of fact tables and a plurality of dimension tables of a data warehouse, said plurality of fact tables and said plurality of dimension tables being initially organized in the form of a first star schema, each of some of said plurality of fact tables and said plurality of dimension tables having a corresponding set of key fields, which are enabled to be configured to change said first star schema to a snowflake schema;

providing an application development framework (ADF) in a digital processing system external to said data warehouse, said ADF containing metadata objects that form a layer of abstraction over said plurality of fact tables and said plurality of dimension tables present in said data warehouse, wherein a developer is enabled to specify links between said metadata objects in said ADF, which in turn updates the key fields of corresponding tables to cause the formation of said snowflake schema in said data warehouse, wherein a business application developed using said ADF is designed to operate with data organized only as star schemas in said data warehouse, thereby necessitating the generation of a second star schema corresponding to said snowflake schema;

generating in said digital processing system, said second star schema corresponding to said snowflake schema, said generating comprising:

maintaining in said ADF, in response to said developer specifying said links, a definition of said snowflake schema comprising said links between said metadata objects;

receiving from a user, in said digital processing system, identifiers of metadata objects in said ADF corresponding to a first set of fact tables to be included in said second star schema, wherein said first set of fact tables is contained in said plurality of fact tables;

inspecting, using said digital processing system, said definition of said snowflake schema maintained in said ADF, said inspecting determining metadata objects in said ADF identifying a first set of dimension tables, wherein said definition indicates that each of said first set of dimension tables is linked to at least one of said first set of fact tables, wherein said first set of dimension tables is contained in said plurality of dimension tables;

including, using said digital processing system, said first set of fact tables and also said first set of dimension tables in the generation of said second star schema, converting data organized according to said snowflake schema in said data warehouse to data according to said second star schema, wherein said receiving, said inspecting and said including enable said user to ensure inclusion of data of the pertinent tables in said second star schema; and processing queries from said business application, said queries being designed to operate with the data organized as said second star schema.

2. The method of claim 1, wherein each of said plurality of fact tables is represented as a corresponding one of a plurality of fact view objects (VOs) in said ADF, wherein each of said plurality of dimension tables is represented as a corresponding one of a plurality of dimension VOs in said ADF, wherein said plurality of fact VOs and said plurality of dimension VOs comprise said metadata objects, wherein each link between a pair of tables is specified as a corresponding one of a plurality of view links in said ADF, wherein each view link specifies as its one end a first end VO and another end a second end VO linking the first table of said pair corresponding to the first end VO and the second table of said pair corresponding to the second end VO, wherein said first end VO is either a fact VO or a dimension VO, and said second end VO is a dimension VO.

3. The method of claim 2, wherein said inspecting and said including together comprises:

identifying a first set of view links having the fact VO corresponding to one of said first set of fact tables as the first end VO, wherein said first set of view links is contained in said plurality of view links;

adding the dimension tables corresponding to the second end VOs for said first set of view links to said first set of dimension tables.

4. The method of claim 3, further comprising:

identifying a next level of view links having the VO of an added dimension table as the first end VO, wherein said next level of view links is contained in said plurality of view links; and adding the dimension tables corresponding to the second end VOs for said next level of view links to said first set of dimension tables.

5. The method of claim 2, wherein said plurality of fact view objects, said plurality of dimension view objects, and said plurality of view links are maintained as data encoded in Extensible Markup Language (XML), wherein said identifying of said first set of view links and said next level of view links comprises parsing said data encoded in XML.

6. The method of claim 2, wherein said first set of fact tables are part of said first star schema, wherein said first set of dimension tables include at least one dimension table added after specification of said first star schema.

7. A computing system comprising:

a data warehouse configured to maintain data in a plurality of fact tables and a plurality of dimension tables, said plurality of fact tables and said plurality of dimension tables being initially organized in the form of a first star schema, each of some of said plurality of fact tables and said plurality of dimension tables having a corresponding set of key fields, which are enabled to be configured to change said first star schema to a snowflake schema;

a server system configured to provide an application development framework (ADF) external to said data warehouse, said ADF containing metadata objects that form a layer of abstraction over said plurality of fact tables and said plurality of dimension tables present in said data warehouse;

a developer system configured to enable a developer to specify links between said metadata objects in said ADF, which in turn updates the key fields of corresponding tables to cause the formation of said snowflake schema in said data warehouse, wherein said server system executes a business application developed using said ADF, said business application designed to operate with data organized only as star schemas in said data warehouse, thereby necessitating the generation of a second star schema corresponding to said snowflake schema; and a synchronization tool configured to generate said second star schema corresponding to said snowflake schema, said synchronization tool operable to:
  maintain in said ADF, in response to said developer specifying said links, a definition of said snowflake schema comprising said links between said metadata objects;
  receive from a user, identifiers of metadata objects in said ADF corresponding to a first set of fact tables to be included in said second star schema, wherein said first set of fact tables is contained in said plurality of fact tables;
  inspect said definition of said snowflake schema maintained in said ADF to determine metadata objects in said ADF identifying a first set of dimension tables, wherein said definition indicates that each of said first set of dimension tables is linked to at least one of said first set of fact tables, wherein said first set of dimension tables is contained in said plurality of dimension tables;
  include said first set of fact tables and also said first set of dimension tables in the generation of said second star schema,
  wherein said synchronization tool generates said star schema containing said first set of fact tables and said first set of dimension tables; and
  convert data organized according to said snowflake schema in said data warehouse to data according to said second star schema,
  wherein said synchronization tool enables said user to ensure inclusion of pertinent tables in said second star schema,
  wherein said server system processes queries from said business application, said queries being designed to operate with the data organized as said second star schema,
  wherein at least one of said data warehouse and said synchronization tool comprises a processor and a memory, said processor retrieving and executing instructions from said memory.

8. The computing system of claim 7, wherein each of said plurality of fact tables is represented as a corresponding one of a plurality of fact view objects (VOs) in said ADF, wherein each of said plurality of dimension tables is represented as a corresponding one of a plurality of dimension VOs in said ADF, wherein said plurality of fact VOs and said plurality of dimension VOs comprises said metadata objects, wherein each link between a pair of tables is specified as a corresponding one of a plurality of view links in said ADF, wherein each view link specifies as its one end a first end VO and another end a second end VO linking the first table of said pair corresponding to the first end VO and the second table of said pair corresponding to the second end VO, wherein said first end VO is either a fact VO or a dimension VO, and said second end VO is a dimension VO.

9. The computing system of claim 8, wherein said synchronization tool, to perform said inspect and said include, is operable to:
  identify a first set of view links having the fact VO corresponding to one of said first set of fact tables as the first end VO, wherein said first set of view links is contained in said plurality of view links; and
  add the dimension tables corresponding to the second end VOs for said first set of view links to said first set of dimension tables.

10. The computing system of claim 9, wherein said synchronization tool is further operable to:
  identify a next level of view links having the VO of an added dimension table as the first end VO, wherein said next level of view links is contained in said plurality of view links; and
  add the dimension tables corresponding to the second end VOs for said next level of view links to said first set of dimension tables.

11. The computing system of claim 8, wherein said plurality of fact view objects, said plurality of dimension view objects and plurality of view links are maintained as data encoded in Extensible Markup Language (XML), wherein said synchronization tool to identify said first set of view links and said next level of view links parses said data encoded in XML.

12. The method of claim 1, wherein a first fact table of said plurality of fact tables is linked to a first dimension table and a second dimension table of said plurality of dimensional tables,
  wherein said receiving receives from said user, a first identifier of a first metadata object corresponding to said first fact table as one of said first set of fact tables along with a second identifier of a second metadata object corresponding to said first dimensional table, but not said second dimension table,
  wherein said determining determines said second dimension table as also being linked to said first fact table, and adds said second dimension table to said first set of dimension tables,
  wherein said including includes said first dimension table in the generation of said star schema in response to said user specifying said first dimension table and includes said second dimension table in the generation of said second star schema in response to said determining.

13. A non-transitory machine readable medium storing one or more sequences of instructions for causing a digital processing system to support business applications to operate based on data stored in data warehouses, wherein execution of said one or more sequences of instructions by one or more processors contained in said digital processing system causes said digital processing system to perform the actions of:

storing data in a plurality of fact tables and a plurality of dimension tables of a data warehouse external to said digital processing system, said plurality of fact tables and said plurality of dimension tables being initially organized in the form of a first star schema, each of some of said plurality of fact tables and said plurality of dimension tables having a corresponding set of key fields, which are enabled to be configured to change said first star schema to a snowflake schema;

providing an application development framework (ADF) in said digital processing system, said ADF containing metadata objects that form a layer of abstraction over said plurality of fact tables and said plurality of dimension tables present in said data warehouse, wherein a developer is enabled to specify links between said metadata objects in said ADF, which in turn updates the key fields of corresponding tables to cause the formation of said snowflake schema in said data warehouse, wherein a business application developed using said ADF is designed to operate with data organized only as star schemas in said data warehouse, thereby necessitating the generation of a second star schema corresponding to said snowflake schema;

generating in said digital processing system, said second star schema corresponding to said snowflake schema, said generating comprising:

maintaining in said ADF, in response to said developer specifying said links, a definition of said snowflake schema comprising said links between said metadata objects;

receiving from a user, in said digital processing system, identifiers of metadata objects in said ADF corresponding to a first set of fact tables to be included in said second star schema, wherein said first set of fact tables is contained in said plurality of fact tables;

inspecting, using said digital processing system, said definition of said snowflake schema maintained in said ADF, said inspecting determining metadata objects in said ADF identifying a first set of dimension tables, wherein said definition indicates that each of said first set of dimension tables is linked to at least one of said first set of fact tables, wherein said first set of dimension tables is contained in said plurality of dimension tables;

including, using said digital processing system, said first set of fact tables and also said first set of dimension tables in the generation of said second star schema;

converting data organized according to said snowflake schema in said data warehouse to data according to said second star schema, wherein said receiving, said inspecting and said including enable said user to ensure inclusion of data of the pertinent tables in said second star schema; and processing queries from said business application, said queries being designed to operate with the data organized as said second star schema.

14. The machine readable medium of claim 13, wherein each of said plurality of fact tables is represented as a corresponding one of a plurality of fact view objects (VOs) in said ADF, wherein each of said plurality of dimension tables is represented as a corresponding one of a plurality of dimension VOs in said ADF, wherein said plurality of fact VOs and said plurality of dimension VOs comprises said metadata objects, wherein each link between a pair of tables is specified as a corresponding one of a plurality of view links in said ADF, wherein each view link specifies as its one end a first end VO and another end a second end VO linking the first table of said pair corresponding to the first end VO and the second table of said pair corresponding to the second end VO, wherein said first end VO is either a fact VO or a dimension VO, and said second end VO is a dimension VO.

15. The machine readable medium of claim 14, wherein said inspecting and said including together comprises one or more instructions for:

identifying a first set of view links having the fact VO corresponding to one of said first set of fact tables as the first end VO, wherein said first set of view links is contained in said plurality of view links;

adding the dimension tables corresponding to the second end VOs for said first set of view links to said first set of dimension tables.

16. The machine readable medium of claim 15, further comprising one or more instructions for:

identifying a next level of view links having the VO of an added dimension table as the first end VO, wherein said next level of view links is contained in said plurality of view links; and adding the dimension tables corresponding to the second end VOs for said next level of view links to said first set of dimension tables.

17. The machine readable medium of claim 15, wherein said plurality of fact view objects, said plurality of dimension VOs, and said plurality of view links are maintained as data encoded in Extensible Markup Language (XML), wherein said identifying of said first set of view links and said next level of view links comprises parsing said data encoded in XML.

* * * * *